(12) United States Patent
Schwarzbich (10) Patent No.: US 9,464,659 B2
(45) Date of Patent: Oct. 11, 2016

(54) TOLERANCE-EQUALIZING ELEMENT

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 55 days.

(21) Appl. No.: 14/411,053

(22) PCT Filed: Jun. 26, 2013

(86) PCT No.: PCT/EP2013/063386
§ 371 (c)(1),
(2) Date: Dec. 23, 2014

(87) PCT Pub. No.: WO2014/005899
PCT Pub. Date: Jan. 9, 2014

(65) Prior Publication Data
US 2015/0330435 A1    Nov. 19, 2015

(30) Foreign Application Priority Data
Jul. 3, 2012   (DE) .................... 20 2012 102 440 U (51) Int. Cl.
| F16B 43/02 | (2006.01) |
| F16B 39/24 | (2006.01) |
| F16B 35/04 | (2006.01) |
| F16B 5/02  | (2006.01) |
| F16B 37/12 | (2006.01) |

(52) U.S. Cl.
CPC ............. *F16B 39/24* (2013.01); *F16B 5/0283* (2013.01); *F16B 35/04* (2013.01); *F16B 5/0233* (2013.01); *F16B 5/0266* (2013.01); *F16B 37/12* (2013.01)

(58) Field of Classification Search
CPC .. F16B 5/0233; F16B 5/0266; F16B 5/0283; F16B 35/04; F16B 37/12; F16B 39/24; F16B 43/02
USPC .......................... 411/9, 11–12, 543–544, 546
See application file for complete search history.

(56) References Cited

U.S. PATENT DOCUMENTS

| 2,934,123 | A |   | 4/1960 | Brancato |
| 3,018,684 | A | * | 1/1962 | Brancato ................. F16B 37/12 411/366.3 |
| 3,121,453 | A | * | 2/1964 | Modrey ................ F16B 5/0208 411/103 |
| 3,272,250 | A | * | 9/1966 | Hattan .................... F16B 37/12 411/106 |
| 4,040,462 | A |   | 8/1977 | Hattan |
| 5,101,213 | A |   | 3/1992 | Harada et al. |
| 5,639,195 | A |   | 6/1997 | Brabston et al. |
| 6,357,953 | B1 | * | 3/2002 | Ballantyne ............ F16B 5/0233 403/365 |
| 6,543,956 | B2 | * | 4/2003 | Schwarzbich ........ F16B 5/0233 403/167 |
| 6,585,447 | B2 | * | 7/2003 | Schwarzbich ........ F16B 5/0233 403/299 |

(Continued)

FOREIGN PATENT DOCUMENTS

| DE | 141159  | 6/1902 |
| DE | 2810001 | 9/1978 |

(Continued)

*Primary Examiner* — Roberta Delisle
(74) *Attorney, Agent, or Firm* — Richard M. Goldberg (57) ABSTRACT

A tolerance equalizing element includes at least two support bodies (120, 122) which are in threaded engagement with one another such that the axial dimension of the tolerance equalizing element can be adjusted by relative rotation of the support bodies (120, 122), at least one of the support bodies (120, 122) including a helical spring which is wound from a wire having a rectangular cross-section, and the rectangle forming the cross-section of the wire is oriented such that its sides extend obliquely relative to the axis of the helical spring.

18 Claims, 6 Drawing Sheets

(56) References Cited

U.S. PATENT DOCUMENTS

| | | | | |
|---|---|---|---|---|
| 7,509,778 B2 * | 3/2009 | Leek | ............... | E04B 1/0007 411/231 |
| 8,066,465 B2 * | 11/2011 | Figge | ............... | F16B 5/025 411/34 |
| 8,202,033 B2 * | 6/2012 | Choi | ............... | B62D 25/147 411/535 |
| 8,864,432 B2 * | 10/2014 | Figge | ............... | F16B 5/025 411/383 |
| 2002/0066246 A1 | 6/2002 | Leek | | |
| 2006/0280579 A1 * | 12/2006 | Seidl | ............... | F16B 5/025 411/546 |
| 2007/0009342 A1 * | 1/2007 | Figge | ............... | F16B 5/0233 411/546 |
| 2007/0140810 A1 * | 6/2007 | Itou | ............... | F16B 37/12 411/251 |

* cited by examiner

TOLERANCE-EQUALIZING ELEMENT

BACKGROUND OF THE INVENTION

The invention relates to a tolerance compensation member having at least two support bodies that are in threaded engagement with one another such that the axial dimension of the tolerance compensation member can be adjusted by relative rotation of the support bodies.

Examples of tolerance compensation members of this type have been described in DE 298 07 967 U1, EP 1 118 605 A1 and EP 1 215 401 A2.

The tolerance compensation members serve in particular for forming a tensed connection between two construction members by means of a connecting bolt that is inserted through the support bodies which have an annular shape. One of the support bodies is in engagement with the connecting bolt via a slide coupling so that, when the connecting bolt is screwed into one of the two constructions members to be connected, the support body is entrained frictionally and is thereby rotated relative to the other support body. In this way, the axial dimension of the tolerance compensation member is increased during the process of screwing-in the bolt, until the compensation member bridges the space between the two construction members. Then, the slide coupling permits the connecting bolt to be screwed-in further whereas the two support bodies maintain their position relative to one another.

In the known tolerance compensation members, the support bodies are formed by cylindrical metal parts that are held in engagement with one another via cut screw threads, e.g. left-handed screw threads.

DE 20 2011 052 036 U1 describes a tolerance compensation member wherein one support body is formed by a helical spring that is wound from a wire. The wire has a rectangular cross-section and is moved such that the inwardly and outwardly facing sides of the rectangle extend in parallel with the axis of the helical spring.

SUMMARY OF THE INVENTION

It is an object of the invention to provide a tolerance compensation member which can be manufactured simpler and cheaper.

According to the invention, this object is achieved with the features indicated in the independent claims.

In one embodiment, at least one of the support bodies comprises a helical spring that is wound from a wire with a non-rectangular cross-section and forms the screw thread of this support body. In another embodiment, the cross-section of the wire is rectangular, but the wire is wound such that its sides are inclined relative to the axis of the helical spring.

Thus, in both embodiments, the support body or at least the threaded part thereof can be formed simply by winding a wire that has a suitable profile, with the thread turns of the screw thread being formed by the profile of the wire. In this way, laborious processes for cutting-type machining of the metal, such as milling or thread cutting, can be eliminated.

Useful details of the invention are indicated in the dependent claims.

In an advantageous embodiment, the helical spring is formed such that its turns are blocked against one another when the spring is non-loaded. Then, the turns of the helical spring may optionally be connected to one another at the faces with which they engage each other, for example by gluing, soldering or welding, e.g. by resistance welding, so that a rigid metal body is formed.

Preferably, both support bodies are formed by helical springs.

Since practically no mill cutting type machining is required for the threaded parts, high-strength spring steels may be used for the helical springs. This has the advantage that a high supporting force is achieved even when the support bodies are in threaded engagement with one another over only a small distance. Consequently, even when the minimum axial dimension of the tolerance compensation member is small, it is possible to achieve a large adjustment range, so that correspondingly large distance tolerances can be compensated.

In a particularly preferred embodiment, the cross-sectional shape of the wire corresponds to a tipped square, so that the parts with which the turns of the helical spring are in block engagement with one another are essentially formed only by the corners of the square cross-sections. The corners of the square that will then face inwardly and outwardly relative to the helical spring will then form both, an internal thread and in external thread.

According to a useful further development of the invention, a terminal plate is arranged on at least one end of the helical spring, the plate having an annular groove that is complementary to the last turn of the helical spring. Consequently, when the last turn of the spring is received in the groove, the thread pitch may be compensated, so that the terminal plate will be in fitting engagement with the end of the helical spring and will have an external surface that is oriented at right angles to the axis of the helical spring and therefore forms a suitable support surface for supporting one of the construction members to be connected. In this way, laborious face grinding of the helical spring can be avoided. The groove in the terminal plate may be formed for example by punching. Eventually, a stable support body with end faces extending precisely at right angles to its axis can be obtained in this way at low costs.

When both support bodies are formed by helical springs, the terminal plates may have two concentric grooves, one for the end of each of the two springs. The ends of the grooves, where their depth is greatest, will then also form an abutment for the end of the wire and assist in preventing the terminal plate from being rotated relative to the helical springs.

BRIEF DESCRIPTION OF THE DRAWINGS

Embodiment examples will now be explained in conjunction with the drawings, wherein.

DETAILED DESCRIPTION

Figure 1:
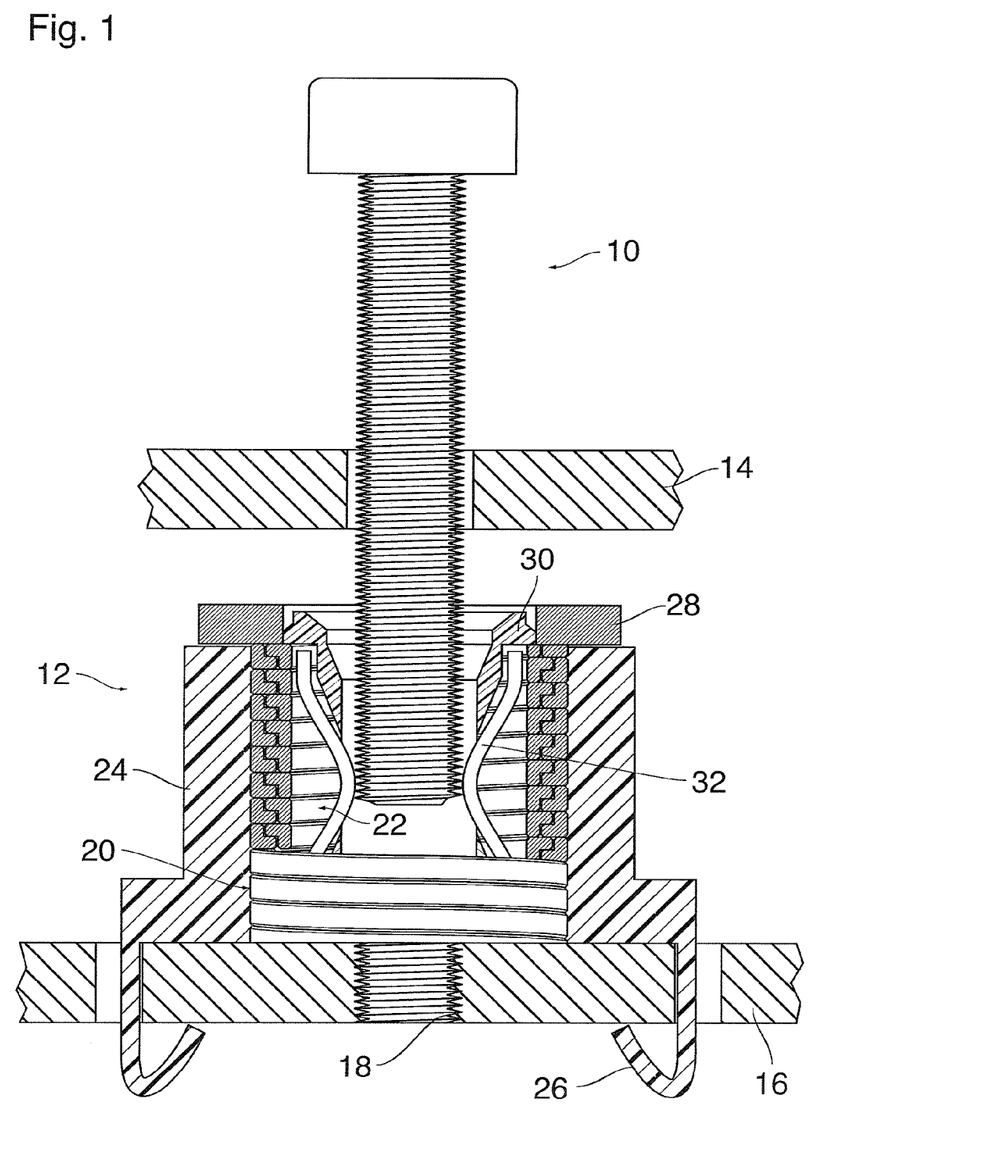
FIG. 1 is an axial section of a connecting device having a tolerance compensation member according to the invention in a condition before the connection is established.

FIG. 1 shows a connecting device that comprises a connecting bolt 10 and a tolerance compensation member 12 and serves for connecting a first construction member 14 to a second construction member 16 with a spacing formed therebetween.

The connecting bolt 10 is inserted through a bore of the first construction member 14 and is screwed into a threaded bore 18 of the second construction member 16. The tolerance compensation member 12 serves as a spacer between the construction members 14, 16. It comprises an outer support body 20 that is configured as a helical spring and is supported at the second construction member 16, and an inner support body 22 that is also configured as a helical spring and is supported (in the final condition) at the first construction member 14.

In the example shown, the outer support body 20 is a left-handed spring wound from a wire that has a non-rectangular cross-section, in this example an L-shaped cross-section with rounded or chamfered edges. When the helical spring is not tensioned, its windings are in blocking engagement with one another. The legs of the L-shaped wire cross-sections that project inwardly, together, form an internal screw thread.

The inner support body 22 is wound, left-handed and with blocking turns, from a wire that has also an L-shaped cross-section. The cross-sections of the wires of the support bodies 20 and 22 are complementary to one another and, together, form a rectangle. Thus, the windings of the inner support body 22 form a an external screw thread that is in engagement with the internal screw thread formed by the support body 20.

In the example shown, the support body 20 is insert-molded or pressed or glued into a plastic socket 24 that may also fill the internal space of the helical spring in the lower part thereof and further has elastic claws 26 with which the socket 24 and, consequently, the support body 20 may be held non-rotatably on the second construction member 16.

The inner support body 22 has its top end connected, e.g. welded, to a metal ring 28. The interior of the metal ring 28 and of the support body 22 accommodate a plastic sleeve 30 the top and bottom ends of which are snap-fastened to the top and bottom ends of the support body 22 so as to hold the windings thereof in blocking engagement.

The windings of the outer support body 20 are held together by the socket 24 in this example.

Optionally, the windings of the support bodies can be welded to one another, so that an even stronger cohesion may be achieved. Particularly suited for this purpose is a resistance welding method wherein a current pulse passes through the wire that forms the helical spring from one end of the spring to the other. Then, the electrical resistance will be largest at the faces where the individual windings of the wire are engaging each other, so that the metal of the wire will be heated locally at these engagement faces and weld the individual turns together.

In this example, the sleeve 30 inside the inner support body 22 serves also for mounting two spring bows 32 that are arranged diametrically opposite to one another and have their top and bottom ends received in respective pockets of the sleeve 30, whereas their inwardly bulging central part projects inwardly through a window of the sleeve 30. Optionally, the spring bows 32 may also be formed in one piece with the sleeve 30.

In the condition shown in FIG. 1, the inner support body 22 has been screwed-in completely into the outer support body 20, so that the metal ring 28 almost rests on the top end of the socket 24 and the uppermost turn of the outer support body 20, whereas a certain gap exists between the construction member 14 and the metal ring 28.

In order to connect the construction members 14 and 16 with one another in such a manner that the relative spacing as shown in FIG. 1 is maintained, the connecting bolt 10 is inserted through a bore of the member 14 and into the inner support body 22. The threaded part of the bolt will thereby force the spring bows 32 outwardly and will deform them elastically, because the top and bottom ends of the bows are supported at the internal surface of the support body 22. Thus, a certain resistance opposes to the further thrust-in movement of the connecting bolt 10, but this resistance can be overcome, so that the bolt may be pushed further until it reaches the threaded bore 18 of the member 16.

Subsequently, the bolt 10 is screwed into the threaded bore 18. As the spring bows 32 are tightened against the periphery of the threaded part of the bolt, there is a relatively high friction between the external screw thread of the bolt 10 and the spring bows 32, so that the spring bows are entrained in rotary direction. Since the spring bows 32 are immobilized in circumferential direction in the respective pockets of the sleeve 30, the sleeve 30 is also entrained in rotary direction. As the sleeve 30 is snap-fastened to the support body 22, the inner support body 22 and the metal ring 28 will also be driven to rotate, clock-wise when seen in the direction in which the bolt 10 is screwed in, because the connecting bolt 10 has a right-handed screw thread.

Figure 2:
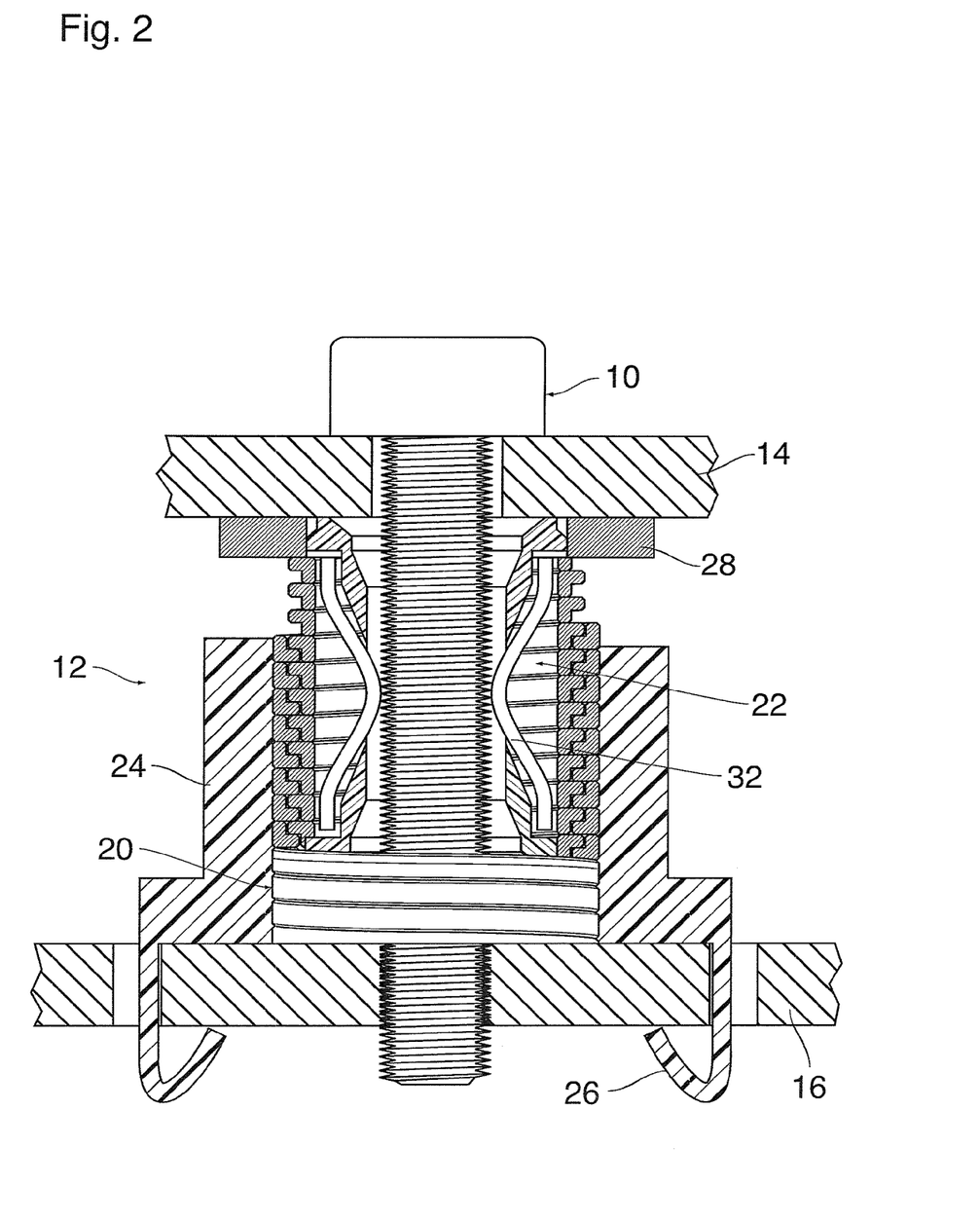
FIG. 2 shows the connecting device according to FIG. 1 in the condition after the connection has been established.

In contrast, the outer support body 20 is prevented from rotating by the socket 24 and the claws 26 that engage the member 16. Consequently, the inner support body 22 rotates relative to the outer support body 20, and, due to the left-handed screw thread with which the support bodies are in engagement with one another, the inner support body 22 is upwardly screwed-out of the outer support body 20 against the direction in which the connecting bolt 10 is screwed-in, so that the metal ring 28 approaches the construction member 14. When the metal ring 28 abuts at the member 14, the further outward screwing movement of the support body 20 is opposed by a larger resistance, so that the slide coupling formed by the threaded part of the connecting bolt 10 and the spring bows 32 will start to slip. The inner support body 22 and the metal ring 28 will then remain stationary in their position as the connecting bolt 10 is screwed further into the member 16. Finally, the condition shown in FIG. 2 is reached in which the head of the connecting bolt 10 engages the member 14 and the construction members 14 and 16 are tensed from opposite sides against the tolerance compensation member 12 which assures the desired spacing between these construction members.

Figures 3, 4:
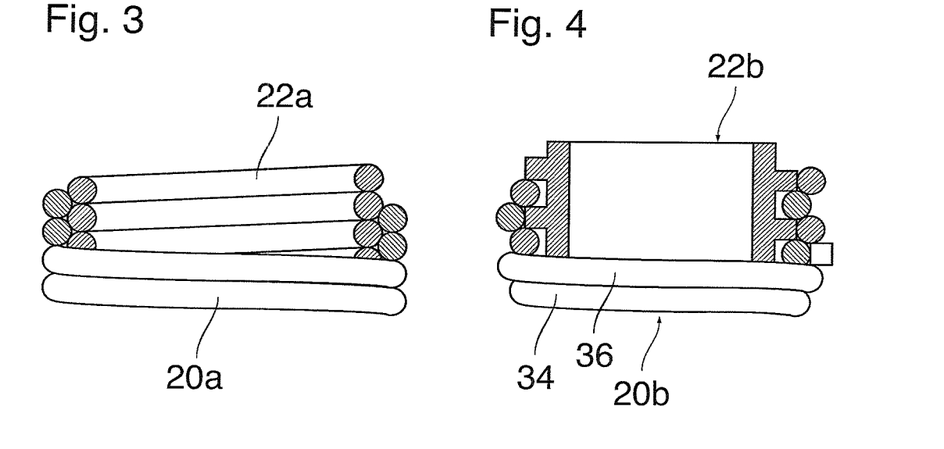
FIGS. 3 to 7 shows examples of helical springs that are wound from wires that have different cross-sectional shapes.

FIGS. 3 to 7 show examples of other possible designs of the inner and outer support bodies. In FIG. 3 an outer support body 20a is formed by a helical spring that is wound from a wire with a round cross-section, with the windings being in blocking engagement. Similarly, an inner support body 22a is formed by a blocked helical spring wound from round wire. Due to the round cross-section of the wire, the internal surface of the outer support body 20a forms, between the individual turns, helically extending recesses into which the outer apexes of the turns of the inner support body 22a may engage, so that a threading engagement between the two support bodies is achieved.

FIG. 4 shows an example in which an outer support body 20b is formed by two nested helical springs 34 and 36 the turns of which are arranged alternatingly and are in engagement with one another. The spring 34 has a somewhat smaller diameter than the spring 36 and thereby forms an internal screw thread the thread grooves of which are wider and deeper than in FIG. 3. A corresponding outer screw thread of an inner support body 22b may engage into this internal screw thread. In the example shown here, the inner support body is a milled metal part having a rolled or cut external screw thread.

Figure 5:
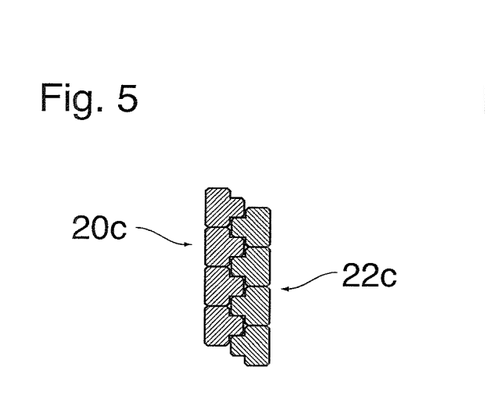

FIG. 5 shows an embodiment in which, again, both support bodies 20c and 22c are wound from wire. What has been shown here is only a part of the peripheral wall of the support bodies being in threaded engagement with one another. In this example, the wire of both support bodies has a T-shaped cross-section. The cross bars of the "T" are blocked against one another whereas the central webs of the "T" form the engaging thread grooves and ridges.

Figure 6:
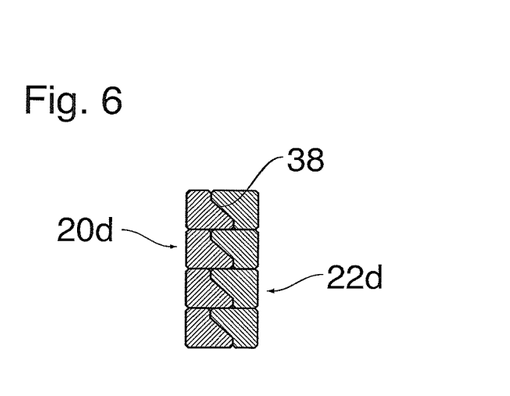

In FIG. 6, an outer support body 20d and an inner support body 22d are wound from a wire the cross-sectional shape of which is similar to the L-shape shown in FIGS. 1 and 2, but with the difference that the complementary thread grooves and ridges have inclined flanks 38.

Figure 7:
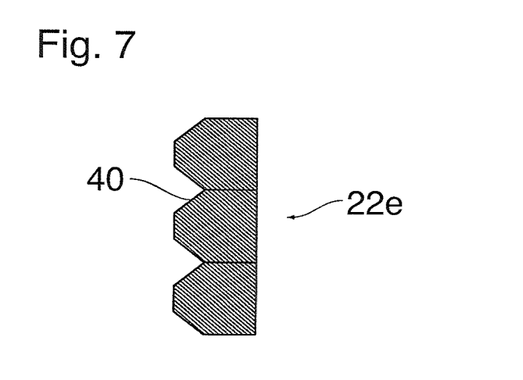

Finally, FIG. 7 shows a section of a part of an inner support body 22e that is wound from a wire with a hexagonal cross-section. The corners of the hexagon on the inner side of the helical spring form 90° corners, so that the turns of the wire will form a smooth internal surface of the helical spring, whereas external thread grooves 40 with a triangular cross-section are formed on the outward side. A corresponding outer support body may be wound from a wire that has a matching cross-sectional shape. Optionally, the outer support body may also have a conventional machine screw thread that is complementary to the outer screw thread of the support body 22e.

Figure 8:
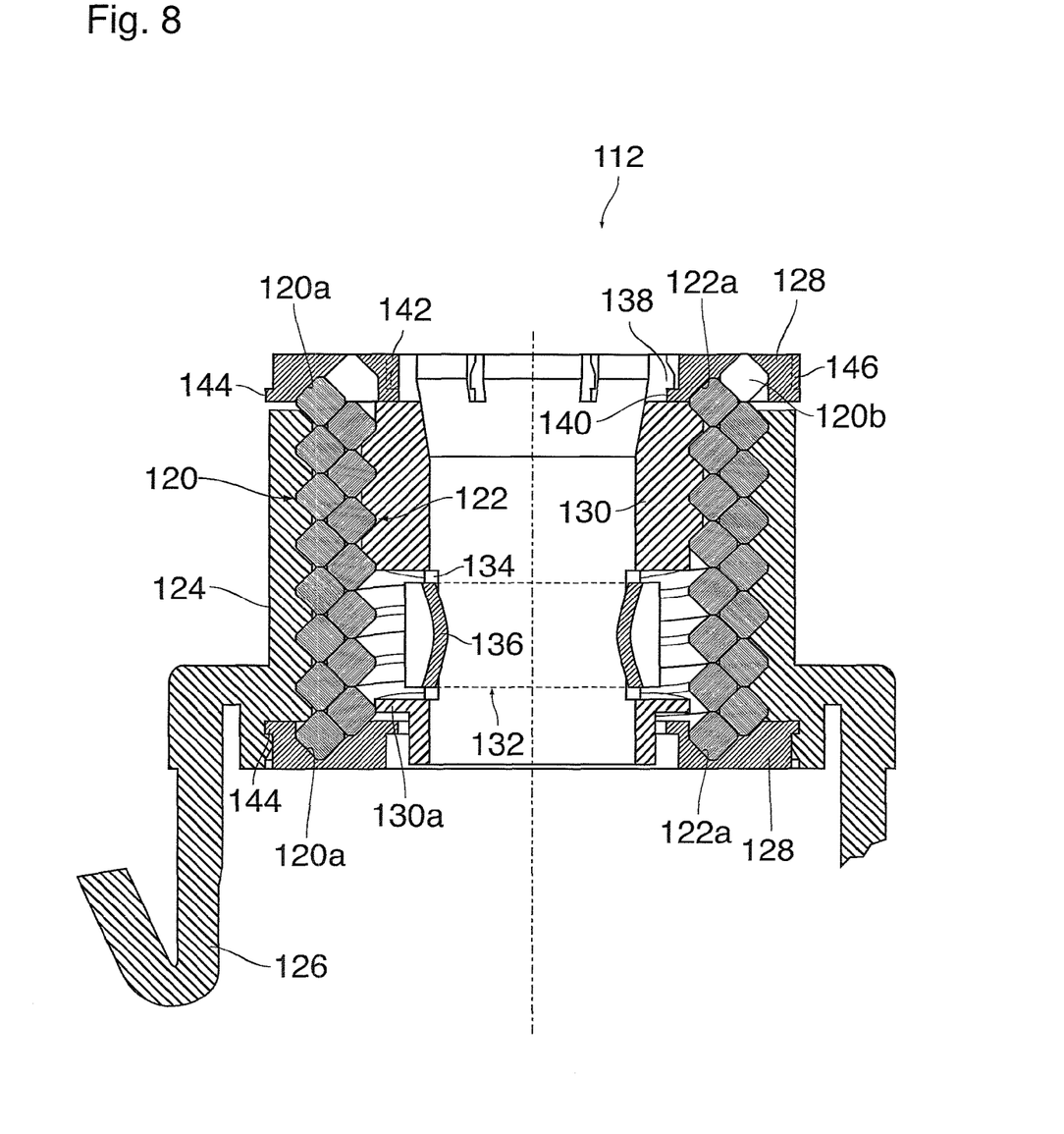
FIG. 8 is an axial section of a tolerance compensation member according to another embodiment.
Figure 9:
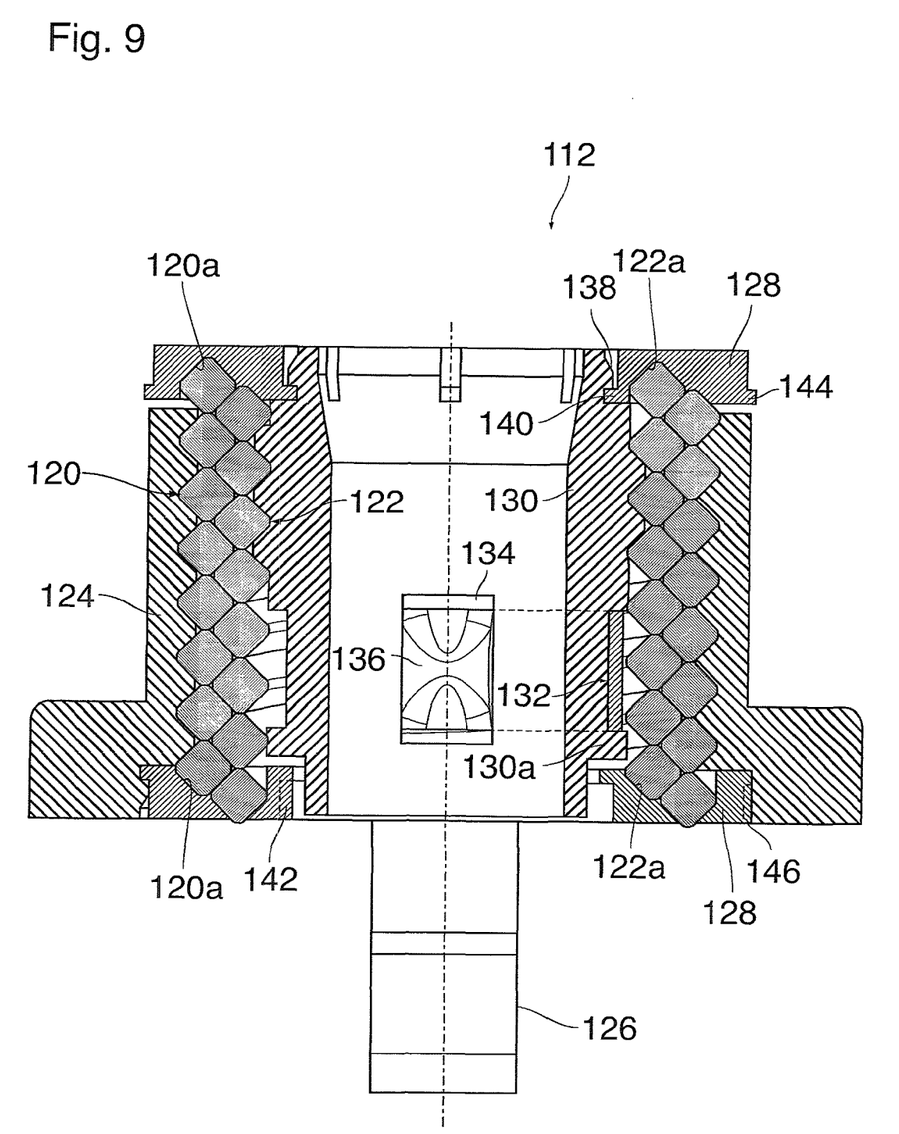
FIGS. 9 and 10 are sectional views of the tolerance compensation member according to FIG. 8 in two different adjustment positions, with the plane of the section being rotated by 90° relative to FIG. 8.
Figure 10:
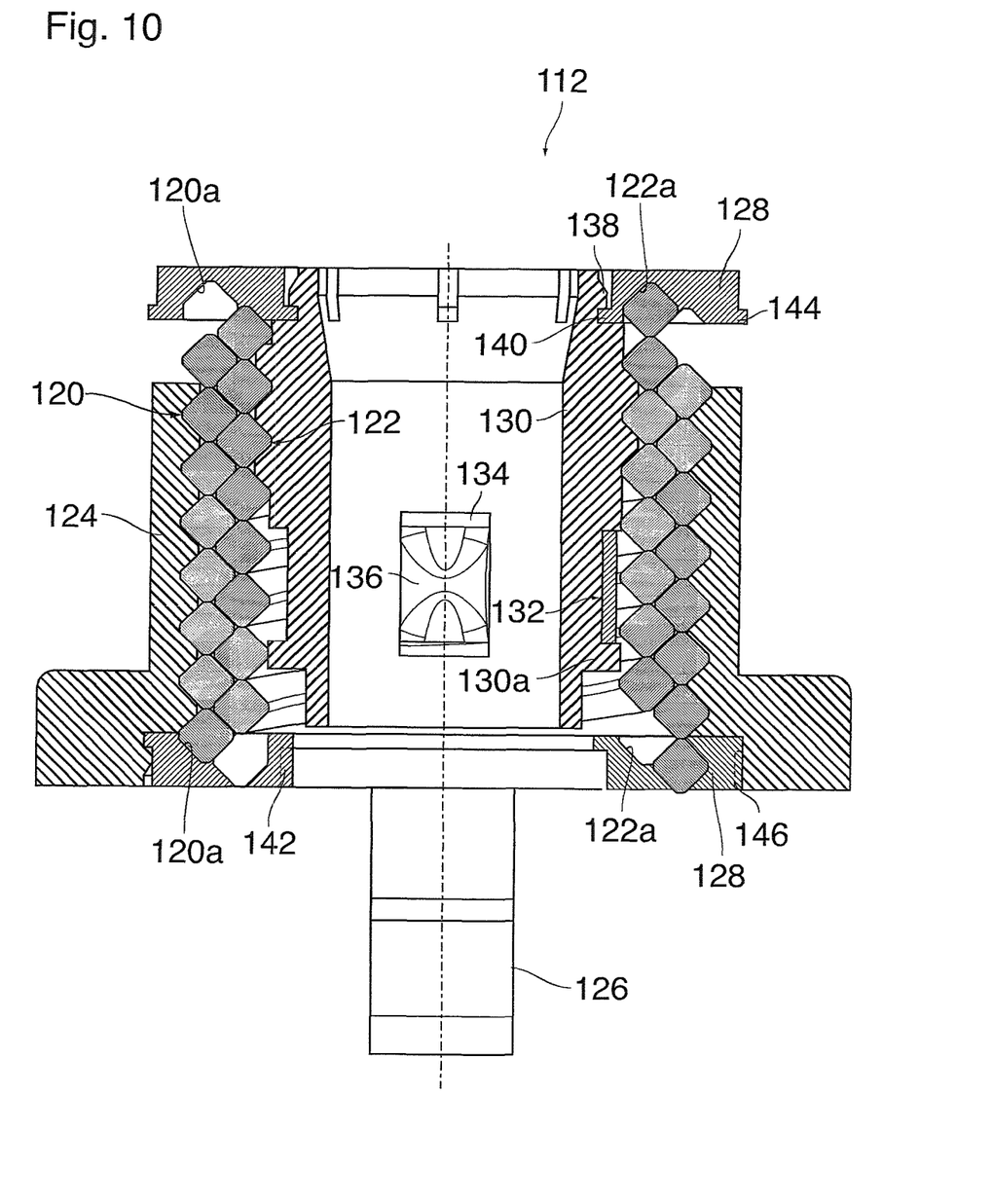

FIGS. 8 to 10 show a tolerance compensation member 112 according to another embodiment. The function is the same as that of the tolerance compensation member 12 shown in FIGS. 1 and 2. Therefore, only the details in which the tolerance compensation member 112 differs from the tolerance compensation member 12 will be described in detail. Details the function of which corresponds to those of details described in conjunction with FIGS. 1 and 2 are designated with the same reference numerals, respectively increased by 100.

The tolerance compensation member 112 has outer and inner support bodies 120, 122 configured as helical springs that are wound from spring steel wire. In this case, however, the wire has the cross-sectional shape of a rhomb, i.e. a tipped square with slightly rounded or chamfered corners. The windings of the wire are again in blocking engagement with one another, so that the square cross-sections engage each other only with the chamfered corners. In case of the outer support body 120, the corners of the squares that face inwardly towards the axis of the helical spring form an internal screw thread (left handed), whereas, in case of the inner support body 122, the outwardly facing corners of the squares form a complementary external screw thread.

In case of the outer support body 120, the outwardly facing corners of the squares form another external screw thread that is threaded into a complementary internal screw thread of a plastic socket 124. The socket 124 has claws 126 with which it can be locked at one of the construction members to be connected (not shown here).

At the top end in FIG. 8, the outer support body 120 is bounded by a terminal plate 128 that is shaped as a metal ring. The terminal plate 128 is a flat, plane-parallel plate and has, on the side facing the support bodies 120 and 122, two annular concentric grooves 120a and 122a that are complementary to the respective last turns at the ends of the support bodies 120 and 122. The depth of the these grooves decreases in circumferential direction from a maximum value that corresponds to the pitch of the helical springs forming the support bodies 120 and 122 continuously to zero, whereby the groove forms a discontinuous step at one position of its periphery, where the depth increases abruptly from zero to the maximum value. In FIG. 8, the sectional plane of the drawing has been laid such that it passes through this discontinuity on the right side in FIG. 8. Therefore, what is visible here is an end face 120b of the wire that forms the top winding of the support body 120. On the left side in FIG. 8, the depth of the groove 120a has decreased to one half of the maximum value, so that only the half of the cross-section of the wire that extends beyond the socket 124 is accommodated in the groove 120a. For the inner groove 122a for the inner support body 122 the depth varies correspondingly, but the discontinuity is formed at a position rotated by 180°, i.e. on the left side in FIG. 8. What is seen here is the closed end of the groove, because the wire that forms the last turn of the support body 122 ends just in front of the sectional plane of the drawing. In contrast, on the right side in FIG. 8, one half of the cross-section of the wire is again accommodated in the groove 122a.

It can further be seen in FIG. 8 that the respective ends of the grooves 120a and 122a where their depth is largest pierce the surface of the terminal plate 128. Therefore, in an end portion that extends over an angular range of 15°, for example, the grooves 120a and 122a are connected to the top surface of the terminal plate 128 by slots.

The terminal plate 128 may be manufactured for example by punching the grooves 120a and 122a into a disk-shaped blank, with the above-mentioned slots being cut free either before or after the step of punching. In this way, a flat top surface of the terminal plate 128 can be achieved with minimal total thickness of the terminal plate 128.

A second terminal plate 128 that has the same construction and shape as the terminal plate described above is arranged at the bottom end of the support bodies 120 and 122 in FIG. 8, but in an inverted position, i.e. with the surface containing the grooves 120a and 122a facing upwards, and rotated by 90°, so that the sectional plane of the drawing does not pass through the discontinuities of the grooves 120a and 122a in this case.

A plastic sleeve 130 has, in its top end portion, an external screw thread with which it is screwed into the internal screw thread of the inner support body 122, which screw thread is formed by the wire profile. In the lower end portion, the sleeve 130 has a collar 130a with which it is supported on the internal surface of the support body 122. Optionally, an externally threaded portion may be provided in place of this collar 130a.

In a central portion, between the upper threaded portion and the collar 130a, the sleeve 130 has a portion with reduced external diameter onto which a spring clip 132 has been snap-fastened. In another embodiment, the spring clip may be formed in one piece with the sleeve.

In FIG. 8, the sectional plane of the drawing passes through two windows 134 that are formed in the peripheral wall of the sleeve 130 in diametrically opposite positions and that are penetrated by projecting ends 136 of the spring clip 132, which ends 136 are convexly bulging inwardly. When a connecting bolt, corresponding to the bolt 10 in FIG. 1, is inserted through the interior of the sleeve 130, the ends 136 of the spring clip will come into frictional engagement with the periphery of the connecting bolt. In this way, a slide coupling is formed which, when the bolt is rotated, drives the spring clip 132 and the sleeve 130 and the inner support body 122 connected therewith for joint rotation with the bolt, so that the inner support body 122 is screwed-out of the outer support body 120.

The axial passage formed in the interior of the sleeve 130 for inserting the connecting bolt is flared conically at its top end in FIG. 8. Here, the peripheral wall of the sleeve forms a corona of elastic catches 138 that permit to attach the terminal plate 128 from above until the catches 138 snap-in at a collar 140 at the inner periphery of the terminal plate.

Above the collar 140, the inner peripheral surface of the terminal plate 128 forms, at one position of its periphery (on the left side in FIG. 8), a cam 142 that engages in a corresponding recess of the sleeve 130 and thereby prevents the terminal plate 128 from being rotated relative to the sleeve 130.

When, in a step of pre-mounting the device, the inner support body 122 is screwed onto the externally threaded portion of the sleeve 130, the screwing movement is stopped when the end of the wire forming the support body 122 abuts at the closed end of the groove 122a. Subsequently, the unit formed of the terminal plate 128, the sleeve 130 and the inner support body 122 can be screwed into the outer support body 120 that is itself held non-rotatably in the socket 124. This screwing movement is stopped when the closed end of the groove 120a abuts at the end face 120b of the wire that forms the outer support body 120. In this way, the screw-threaded engagement between the two support bodies is prevented from being tightened too strong, so that the frictional force of the slide coupling will be sufficient to cause the inner support body 122 to be screwed-out again.

At their outer peripheral edge, each of the terminal plates 128 has a collar 144 which, in case of the bottom terminal plate in FIG. 8, serves to snap-fasten this terminal plate in a corresponding recess of the socket 124. At one location at its outer periphery (on the right side of the top terminal plate in FIG. 8) the terminal plates 128 have another cam 146. When the terminal plate is used as the bottom end plate, this cam 146 serves to secure the terminal plate 128 non-rotatably in a corresponding recess of the socket 124. When the inner support body 122 is screwed into the outer support body 120 and a torque (counter clock-wise) is exerted onto the outer support body 120, the end of the wire that forms the lowermost turn of the body is supported at the closed end of the groove 120a in the lower terminal plate.

FIG. 9 shows the tolerance compensation member 112 of FIG. 8 in a sectional view with the plane of the section being rotated by 90°. In this case, the plane of the section passes through the cams 142 and 146 of the lower terminal plate 128. One of the windows 134 and one of the ends 136 of the spring clip 132 are seen in a front view, whereas the C-shaped bow of the spring clip that straddles the reduced-diameter portion of the sleeve 130 is seen in cross-section.

FIG. 10 is a sectional view of the tolerance compensation member in the same sectional plane as in FIG. 9, but in a condition in which the inner support body 122 has been screwed-out by one turn.

Since the helical springs that form the support bodies 120 and 122 of the tolerance compensation member 112 are subject only to compressive forces when the device is in use and since, further, the individual turns are fixated by the internal screw thread of the socket 124 and, as the case may be, the external screw-threaded portions of the sleeve 130, it is not compulsory to firmly interconnect the individual turns of the helical springs by gluing or welding.

The invention claimed is:

1. A tolerance compensation member comprising at least two support bodies held in screw-threaded engagement with one another such that an axial dimension of the tolerance compensation member is adjustable by relative rotation of the support bodies, wherein at least one of the support bodies comprises a helical spring having an axis and that is wound from a wire with a rectangular cross-section, and the rectangle forming the cross-section of the wire is oriented such that sides thereof are inclined relative to the axis of the helical spring, wherein an outer one of said at least two support bodies is formed by a helical spring having turns of which form both an internal screw thread and an external screw thread, and further comprising a socket that surrounds the outer support body and has an internal screw thread in engagement with the external screw thread of this support body.

2. The tolerance compensation member according to claim 1, wherein the wire that forms said at least one support body has a square cross-section, and is wound such that sides of the square form a respective angle of 45° with the axis of the helical spring.

3. The tolerance compensation member according to claim 2, wherein the wire that forms said at least one support body has a square cross-section with one of:
chamfered corners and
rounded corners.

4. The tolerance compensation member according to claim 1, wherein an inner one of said at least two support bodies is formed by a helical spring the turns of which form both, an external screw thread and an internal screw thread, and, further comprising a sleeve in an interior of the inner support body, the sleeve having an external screw thread in engagement with the internal screw thread of this support body.

5. A tolerance compensation member comprising at least two support bodies which are in screw-threaded engagement with one another such that an axial dimension of the tolerance compensation member is adjustable by relative rotation of the support bodies, and at least one of the support bodies comprises a helical spring that is wound from a wire with a non-rectangular cross-section and forms a screw-thread of this support body, wherein said at least one support body includes two support bodies, and both support bodies are wound from wire and have internal and external screw threads complementary to one another.

6. The tolerance compensation member according to claim 5, further comprising a plastic socket, and wherein at least one of the support bodies is embedded in the plastic socket.

7. The tolerance compensation member according to claim 5, further comprising a sleeve, and wherein at least one of the support bodies is snap-fastened to the sleeve that is arranged co-axially with this support body and embraces opposite ends of the helical spring forming this support body.

8. The tolerance compensation member according to claim 7, wherein the sleeve carries at least one elastic member that projects radially into an interior of the sleeve and forms a slide coupling for a connecting bolt that passes through the at least two support bodies.

9. The tolerance compensation member according to claim 5, wherein turns of the helical spring are in blocking engagement with one another in a non-loaded state of the spring.

10. The tolerance compensation member according to claim 9, wherein the turns of the helical spring are firmly connected to one another at faces with which they engage each other.

11. A tolerance compensation member comprising at least two support bodies which are in screw-threaded engagement with one another such that an axial dimension of the tolerance compensation member is adjustable by relative rotation of the support bodies, and at least one of the support bodies comprises a helical spring that is wound from a wire with a non-rectangular cross-section and forms a screw-thread of this support body, wherein at least one end of the support body that is formed by a helical spring has a terminal plate that forms an annular groove with a depth that varies in a circumferential direction, for accommodating a last turn of the helical spring.

12. The tolerance compensation member according to claim 11, wherein one end of the annular groove, at which a depth of this groove changes discontinuously, forms an abutment for one end of the wire that forms the helical spring.

13. The tolerance compensation member according to claim 11, wherein the terminal plate has two concentric grooves, for accommodating the respective last turns at the end of both helical springs.

14. The tolerance compensation member according to claim 11, having terminal plates with identical shapes on both ends of the support bodies.

15. The tolerance compensation member according to claim 11, further comprising a socket in which least one of the support bodies is embedded, and wherein the terminal plate is adapted to be snap-fastened at the socket.

16. The tolerance compensation member according to claim 15, wherein the terminal plate and the socket are locked against relative rotation.

17. The tolerance compensation member according to claim 11, further comprising a sleeve in which at least one of the support bodies is snap-fastened, and wherein the terminal plate and the sleeve are adapted to be snap-fastened to one another.

18. The tolerance compensation member according to claim 17, wherein the terminal plate and the sleeve are locked against relative rotation.

\* \* \* \* \*